United States Patent [19]

Buehning

[11] Patent Number: 4,889,476

[45] Date of Patent: Dec. 26, 1989

[54] MELT BLOWING DIE AND AIR MANIFOLD FRAME ASSEMBLY FOR MANUFACTURE OF CARBON FIBERS

[75] Inventor: Peter G. Buehning, Short Hills, N.J.

[73] Assignee: Accurate Products Co., N.J.

[21] Appl. No.: 130,359

[22] PCT Filed: Jan. 10, 1986

[86] PCT No.: PCT/US86/00041

§ 371 Date: Nov. 5, 1987

§ 102(e) Date: Nov. 5, 1987

[87] PCT Pub. No.: WO87/04195

PCT Pub. Date: Jul. 16, 1987

[51] Int. Cl.[4] .............................................. B29C 47/12
[52] U.S. Cl. ..................................... 425/72.2; 264/12;
425/192.5; 425/378.2; 425/464
[58] Field of Search ..................... 219/523, 544, 546;
264/12, 29.2, 518, DIG. 75; 425/72.2, 83.1, 192
S, 376 A, 378 R, 378 S, 461, 464, 466; 65/5, 7,
16

[56] References Cited

U.S. PATENT DOCUMENTS

| | | | |
|---|---|---|---|
| 828,155 | 8/1906 | Vittenet | 425/72.2 |
| 2,045,326 | 6/1936 | Kinsella | 425/72.2 |
| 3,352,653 | 11/1967 | Speth | 65/16 |
| 3,357,808 | 12/1967 | Eberle | 65/16 |
| 3,379,811 | 4/1968 | Hartmann et al. | 425/72.2 |
| 3,547,610 | 12/1970 | Holman | 65/16 |
| 3,621,531 | 11/1971 | Feltgen et al. | 65/16 |
| 3,653,861 | 4/1972 | Stalego et al. | 65/16 |
| 3,825,380 | 7/1974 | Harding et al. | 264/211.17 |
| 3,942,723 | 3/1976 | Langdon | 425/72.2 |
| 3,970,417 | 7/1976 | Page | 425/72.2 |
| 3,978,185 | 8/1976 | Buntin et al. | 264/518 |
| 3,985,481 | 10/1976 | Brackmann et al. | 425/72.2 |
| 4,295,809 | 10/1981 | Mikami et al. | 264/12 |
| 4,486,161 | 12/1984 | Middleton | 425/192 S |
| 4,526,733 | 7/1985 | Lau | 425/72.2 |
| 4,606,872 | 8/1986 | Watanabe | 425/72.2 |

Primary Examiner—Jay H. Woo
Assistant Examiner—C. Scott Bushey
Attorney, Agent, or Firm—R. L. Graham

[57] ABSTRACT

A metal block melt blowing die has paired longitudinal grooves within its bottom surface adjacent a triangular cross section die tip nose. A series of vertical circular bores within the body opening to the grooves support cartridge heaters sized to the bores permitting rod penetration into the bores from either end for removing wedged cartridge heaters. The grooves carry upper and lower air deflector blocks which are spaced from each other to form a tortuous air passage therebetween for insuring turbulence to the attenuating air streams passing therethrough and between laterally and vertically adjustable air plates for varying the air gap between the ends of the air plates at the bottoms of the grooves and the die tip nose and the velocity of the air streams converging at the die tip extrusion holes. A rectangular frame carries unitary diametrically opposed mounting blocks within the rectangular frame with cylindrical air manifolds on respective sides thereof. The die mounts at its ends to the blocks. Tube couplings with corrugated tube portions facilitate connection between the cylindrical air manifolds and air chambers extending along opposite sides of the melt die body to facilitate removal, maintenance and/or replacement of the die body.

3 Claims, 3 Drawing Sheets

MELT BLOWING DIE AND AIR MANIFOLD FRAME ASSEMBLY FOR MANUFACTURE OF CARBON FIBERS

FIELD OF THE INVENTION

This invention relates to the melt blowing of carbon fibers, and more particularly to an improved melt blowing die and its support for controlled hot gas stream attenuation of fine carbon fibers.

BACKGROUND OF THE INVENTION

Carbon and graphite fibers are currently manufactured by extruding molten carbonaceous material through fine extrusion holes, and spun into fine threads or filaments. The filaments are subsequently stabilized, i.e. rendered infusible through a heat treatment in an oxidizing atmosphere and then heat treated in an inert atmosphere to convert them into carbon or graphite fibers.

Spinning of the carbon or graphite fibers involves using an oxygen rich (air) hot gas to draw the filaments from an extrusion die to produce fibers of very small diameter, as low as about 2 microns. The oxygen penetrates the molten fibers and is entrapped as the fibers cool. The presence of oxygen within the individual fibers assists in stabilizing the fibers in the subsequent steps of the process. Melted fiber precursor pitch is supplied from a suitable tank, fed under pressure through a die by operation of a suitable pump. The molten pitch is expressed through die openings as a series of vertical laterally spaced holes within a melt-blow die into the oxygen rich gas stream. The compressed air impinges through oblique slots against the extruded pitch material to form a plurality of fine pitch fibers. The die tip is of triangular cross-section, having downwardly, inwardly, and oppositely directed sloping walls fitted into a triangular shaped opening defined by opposed air plates or air lips forming the attenuating air passages. The melted pitch passes through the die openings and upon discharge therefrom, is contacted by the high velocity hot gas streams which pass through the oblique slots angled to intersect just below the die openings. The air streams attenuate the molten pitch fibers and draw them down to a diameter significantly smaller than the diameter of the multiple die openings within the die tip.

Problems have been encountered in maintaining the pitch at proper uniform temperature along the length of the die relative to the hundreds of extrusion holes within the die tip. The utilization of the air streams for fiber attenuating purposes has in some cases materially adversely affected the maintenance of a uniform and set temperature and the extrusion of the pitch under pressure through multiple orifices created by the fine holes within the die head and opening to the apex of the die tip nose. The presence of the air streams have tended to cause build up of the pitch at the tip of the melt blowing die, interfacing with the attenuating air stream.

Attempts have been made to improve melt blowing dies to facilitate the fiber or filament drawing process. U.S. Pat. No. 3,825,380 is directed to a die having a special nose configuration of triangular cross-section and particularly suitable for melt blowing of very fine fibers with the design of the melt blowing die eliminating dead spaces on the edge of the junction of two sides of the triangle of the die tip nose where the orifices open at the apex end of the melt blowing die.

U.S. Pat. No. 4,285,655, which is directed to a coat hanger die, employs a formula wherein the radius of the manifold at its inlet is selected in consideration of the flow characteristics of the resin melt to provide a low melt velocity at the inlet for the melt led under pressure to the plurality of extrusion orifices remote from that inlet.

U.S. Pat. No. 4,295,809 provides a mechanism for shifting the air lips relative to the triangular cross-sectional die tip nose for controlling the flow of heated gas blown out through air slots on either side of the die nose. Adjustments are made via appropriate spacers of the set back of the lower face of the air lips relative to the point of intersection of the oblique surfaces of the die tip, as well as the gaps between the air lips and the die tip itself through which the dual air streams pass for intersection downstream of the small diameter holes through which the melt is expressed.

While these patents represent some attempts at improving the operation of the melt blowing die and the creation of uniform melt blown filaments without plugging or stoppage of the melt blowing die producing the same, problems persist within the industry, particularly where the melt material has a relatively high softening temperature.

It is, therefore, a primary object of the present invention to provide an improved melt blowing die, particularly useful in spinning high softening temperature carbonaceous material fibers and their subsequent conversion to carbon or graphite fibers of better uniformity and at lower cost; in which the attenuating air streams have improved controllability; the presence of the attenuating air streams does not adversely affect the creation of and maintenance of the proper temperature of the pitch melt during the extrusion of the same; the air flow streams are thermally isolated from the body of the die; the die has excellent heat stability and control, and wherein the components may be mechanically assembled and disassembled with ease while allowing certain elements to be readily removed without the necessity of dismantling the complete assembly of the melt blowing die itself.

DESCRIPTION OF THE PREFERRED EMBODIMENT

Figure 1:
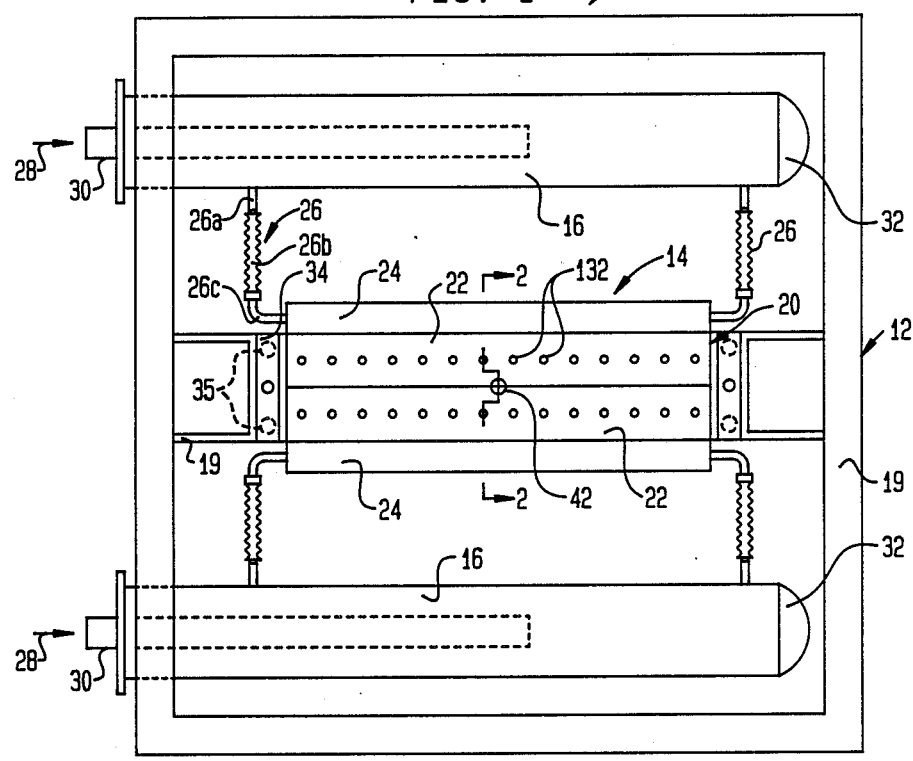
FIG. 1 is a top plan view of an air manifold frame and melt blowing die assembly forming a preferred embodiment of the present invention.

Referring initially to FIG. 1, there is illustrated an air manifold frame and melt blowing die assembly, indicated generally at 10, comprising two main components, an air manifold frame indicated generally at 12 and an improved melt blowing die 14 for pitch spinning of fine filaments of high softening temperature carbonaceous material and permitting subsequent change to carbon or graphite form.

The melt blowing die 14 fixedly supports to either side thereof, air manifolds 16. The melt blowing die 14 is fixedly mounted to the frame 12 by mounting blocks via screws 35 integral with diametrically opposed frame members 19, at the center of the frame 12, with the melt blowing die 14 bolted or screwed at its ends to mounting blocks, integral with frame 12.

As shown in FIG. 1, the melt blowing die 14 is formed principally by a machined metal die body, indicated generally at 20, comprised of two, mirror image die body halves 22 in side-to-side abutment. Rectangular, parallelepiped air chambers 24 are screwed or bolted to the outside sides of the die body halves 22. The function of the die body 20 is to express molten pitch through a series of aligned closely spaced very small extrusion holes within the die tip of the melt blowing die 14, with the extrusions being attenuated by an inert gas stream such as air impinging on the extruded material as it leaves the tip of the melt blowing die. The filament forming expressed material is drawn outwardly and away from the small diameter extrusion holes within the die tip by the air streams impinging on the material from opposite sides thereof.

A compressed inert gas such as air is fed to the interior of the air manifolds 16 from sources, indicated by arrows at 28, via hose or pipe fittings 30 at one end of each cylindrical air manifold 16. The opposite ends of the air manifolds are closed off by end caps 32. The compressed air interiorly of the air manifold is bled from the interior thereof through tube couplings, indicated generally at 26, opening at one end 26a to opposite ends of the air chambers 24. The tube couplings 26 include a corrugated tube central section 26b joining rigid hollow metal tubes to each end to permit fluidtight connections to be maintained in spite of some axial expansion or contraction thereof as a result of temperature change. The opposite ends 26c of the tube couplings mount to the ends of the air chambers 24 and open to the interior thereof. The air chambers 24 are of the same length as die body 20.

Diametrically opposed mounting flanges 34 fixedly mount the ends of the die body 20 to mounting blocks, via screws 35. The mounting blocks, integral with the frame 12 locate the melt blowing die 14 in position for use while permitting its easy removal for maintenance or replacement. Further, tube couplings 26 facilitate the separation of the integrated air chambers 24 from the air manifolds 16 during such maintenance or replacement.

As will be appreciated hereinafter, the machined metal die body halves 22 include a series of longitudinally spaced, vertical holes or bores 38 within which are positioned cartridge halves 22 to maintain the pitch passing therethrough molten to insure the carbonaceous filaments are extruded from the die tip extrusion holes. Additionally, as seen in FIG. 1, a larger diameter circular cylindrical vertical pitch inlet passage or hole 42 is formed on centerline 44 of the die body 20 defined by the mating sidewalls of the die body halves 22. Passage or hole 42 receives the pressurized molten pitch from a pitch supply line (not shown), as may be better appreciated from viewing FIGS. 2 and 4.

Figure 2:
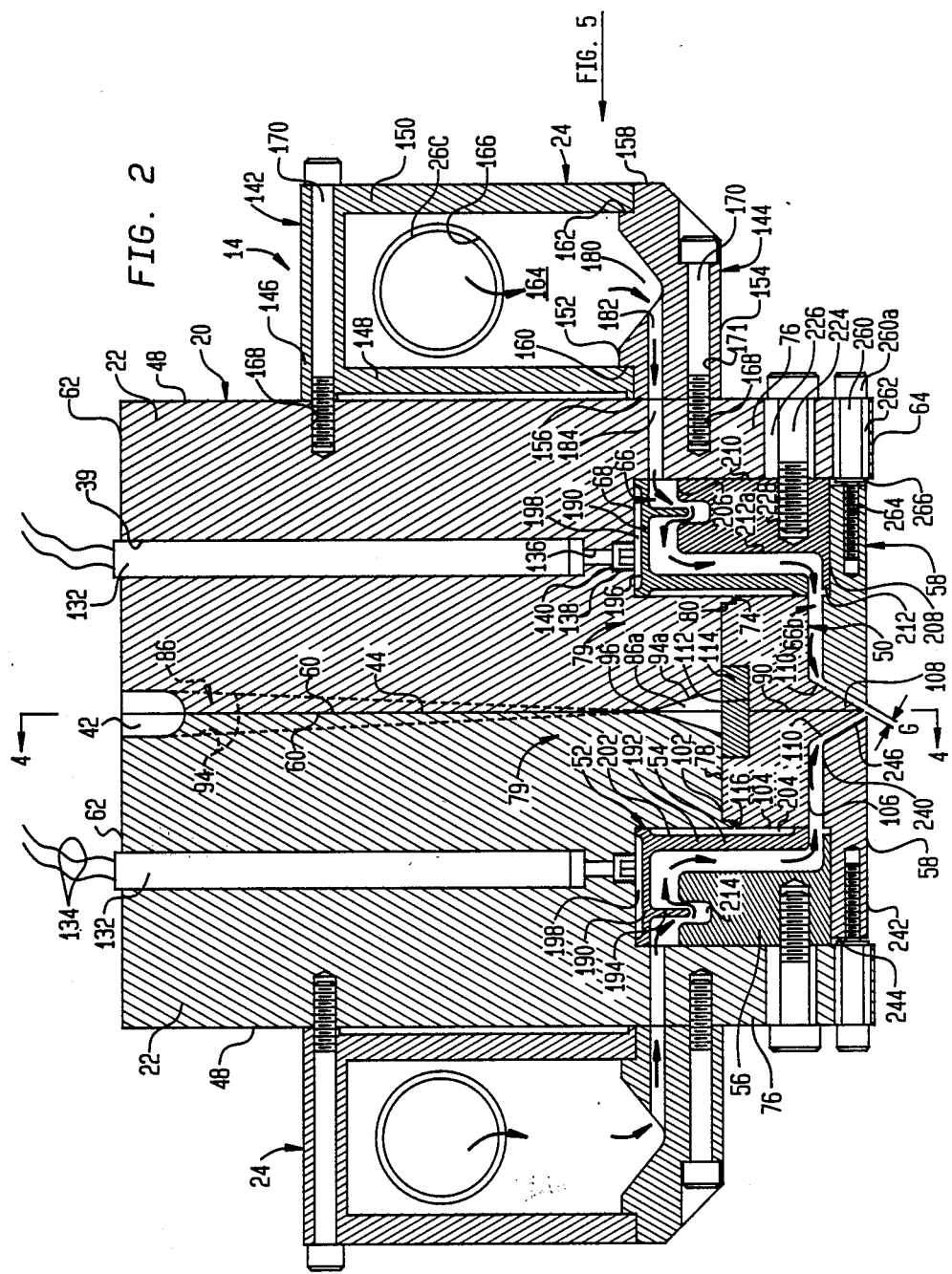
FIG. 2 is a vertical, transverse sectional view of the melt blowing die of FIG. 1 taken about lines 2—2.

Referring next to FIG. 2, this enlarged transverse vertical sectional view shows the make up of the melt blowing die 14 and its major components. In addition to the melt blowing die body 20 comprised of body halves 22 and the air chambers 24 indicated generally at 24, mounted respectively to the exterior side faces 48 of the die body halves 22, the melt blowing die 14 includes a die tip indicated generally at 50 mounted to and integrated with the die body halves 22 and spanning the centerline 44 of the die body 20, a pair of air deflector assemblies indicated generally at 52 and a pair of air plates 58. The air deflector assemblies are comprised of two basic machined metal blocks or bodies; a male air deflector block 54 and a female air deflector block 56.

The die body halves 22 are of generally rectangular parallelepiped form, each having a vertical interior side face 60 opposite exterior side face 48, a top face 62, and bottom face 64. The side faces are at right angles to the top and bottom faces. A large L-shaped recess or groove 66 is formed within the bottom face 64 defining a narrow groove bottom wall 68, laterally opposed groove vertical sidewalls, and a stepped horizontal wall 74. In turn, wall 74 is recessed at 78 to define a shoulder 80. As such, the bottom of the body halves have laterally spaced vertical projections running longitudinally the full length of the die head as at 76 and 79 respectively to the outside and inside of the die body halves 22. Within each of grooves 66 are mounted the male and female air deflector blocks 54, 56, as well as air plates 58 to respective sides of die tip 50.

Figure 4:
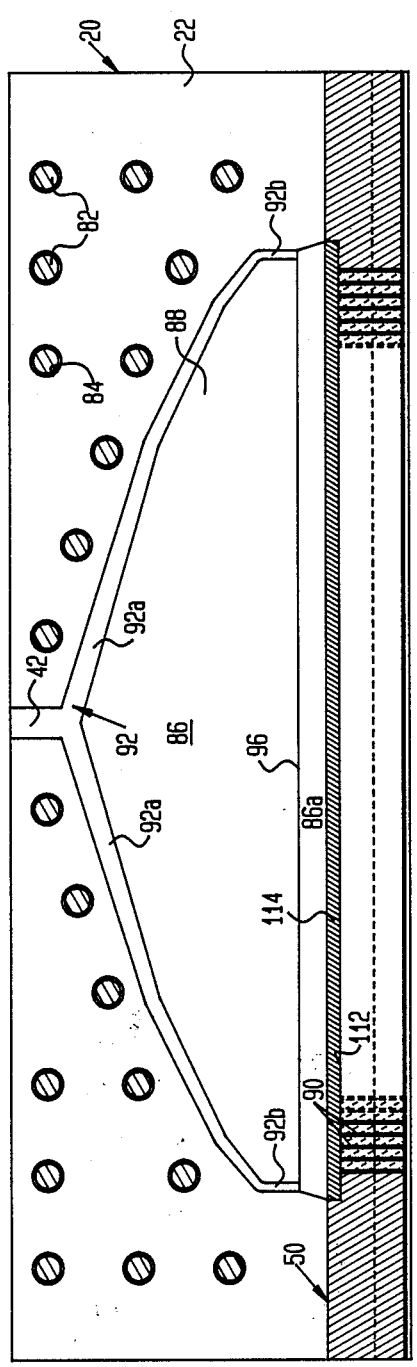
FIG. 4 is a longitudinal vertical sectional view of the melt blowing die at the vertical interface of the die body halves.

Referring next to FIG. 4, it may be seen that the die body halves 22 are maintained in flush abutment at opposed side faces 60 of members 22 via a number of coupling bolts or screws 82 having threaded ends within tapped holes 84. It is noted that the coupling bolts or screws 82 are located to the right and left and outside of a coat hanger cavity, indicated generally at 86. Cavity 86 is defined by coat hanger type mirror image coat hanger recesses 88 of coat hanger configuration with vertical, pitch inlet passage 42 opening to that cavity.

It is important to keep in mind that the pitch producing ultimately the fine micron sized diameter carbon or graphite filaments is a high softening point pitch, requiring it to be initially brought to a temperature in the range of 400° to 800° F., to melt the pitch and then such melting temperature must be maintained when distributing the molten pitch after passage through vertical pitch inlet passage 42 into and through cavity 88, for extrusion into filaments via the tens or hundreds of fine longitudinally spaced vertical extrusion orifices or holes 90 within die tip 50, FIG. 4.

To maximize the number of filaments being blown drawn and therefore the number of die extrusion orifices or holes 90, the coat hanger type die 20 has the disadvantage that residence time of the pitch is quite long, deterioration of the molten pitch due to heat is promoted, and extrusion of uniform filaments is difficult and is aggravated by the difficulty in temperature control due to the large mass of the metal die bodies 22 required to resist the high pressure of the molten pitch extruded through the small diameter holes 90. Coat hanger type dies facilitate this process. The inlet passage 42 diverts the molten pitch through a split coat hanger manifold 92 whose manifold sections 92a taper off to vertical manifold side ends 92b, such that the residence time distribution of the pitch is relatively uniform over the complete length of the die body bearing the extrusion orifices or holes 90.

As may be seen in FIG. 2, the inlet passage 42 merges with the manifold 92 and, in turn, the manifold 92 feeds a downwardly tapering coat hanger cavity 86 whose lateral sidewalls 94 move closer to each other as the pitch travels towards the lower portion of the coat hanger cavity 86. As the molten pitch is forced downwardly through the coat hanger cavity 86 and between converging, sidewalls 94 of that cavity, the pitch reaches a maximum restriction along line 96 within the cavity 86, at which line, the cavity sidewalls 94 diverge obliquely away from each other as at 94a, FIG. 2. The oblique sidewalls 94a of the coat hanger cavity 86 define a downwardly enlarging cavity portion 86a within the projections 79 of the two die body halves 22.

The melt blowing die 14 is made up of a series of machined metal block components, all of which run the full length of the assembly including the die body halves 22 and die tip 50. The machined metal blocks may be of stainless steel.

Spanning across and having a lateral width equal to the total width of the center projections 79 of the die body halves 22, is die tip 50, which is formed of a rectangular cross-section base portion having an upper surface 102, right angle sides 104 and a bottom surface 106. Projecting downwardly from the center of base portion and integral therewith is a triangular-shaped die tip nose 108. The extrusion holes 90 are drilled through the center of the die tip 50 and open at the apex of the triangular die tip nose 108 of that member. A rectangular cross-section groove 112 is machined within the upper surface 102 of the die tip extending beyond the ends of the coat hanger cavity 86 and somewhat beyond the line of extrusion holes 90. Mounted within the rectangular cross-section groove 112 and filling the same is a similarly sized and configured screen pack 114. The screen pack 114 is a conventional filter type medium such as 150 mesh stainless steel screen whose function is to shear the molten pitch liquid to reduce the viscosity of the fluid entering the small diameter extrusion holes 90 within the die tip 50. The screen pack 114 faces the widest portion of the triangular cross-section shaped portion 86a of the coat hanger cavity 86 and spans the same to facilitate the passage of the pitch melt through the screen pack 114 and it subsequent passage through the fine diameter extrusion holes 90.

The upper face 102 of the die tip base includes recesses 116 to opposite sides thereof forming steps, permitting the stepped portion of the base to fit within the recesses 79 of the die body halves 22.

One of the important aspects of the present invention is the manner in which the components of the melt blowing die are detachably mounted to each other to facilitate maintenance and repair while creating a melt blowing extrusion die capable of producing under high pressure, fine blown spun filaments of high softening temperature mesophase carbonaceous pitch. The step mounting of the die tip 50 across the interface 44 between die body halves 22 and to the lower end of those blocks is achieved through the utilization of a number of counting screws 120, FIG. 3. A series of longitudinally spaced, aligned tapped holes 122 are formed within the interior projections 79 of both die body halves 22 at recesses 78. Further, base of the die tip 50 includes a series of longitudinally spaced, drilled holes 124 to opposite sides of the line of extrusion holes 90, with holes 124 counterbored at 126 so as to receive the heads 120a of the mounting screws 120. Heads 120a are therefore recessed within the bottom face 106 of the die tip 50.

The inert gas, such as air, under pressure for attenuating the extruded pitch material as it exits the extrusion holes 90, tends to offset the requirement for sustained uniform high temperature of the die body halves 22 through which the extrusion melt passes. The present invention utilizes die body halves 22 which are considerably wider, thus providing more mass to the melt blowing die than those conventionally employed in the art. Further, conventionally, electric cartridge heaters of the Calrod type are borne by the die body to maintain the pitch at or above melt temperature as it passes under pressure through the coat hanger cavity 86 for uniform distribution to the aligned longitudinally spaced extrusion holes 90 within the die tip 50. By increasing the lateral thickness of the die body halves 22, greater spacing of such cartridge heaters from the feed entry point or pitch inlet passage 42 and the coat hanger cavity 86 which are on the centerline 44 of the die body 20, is achieved. The die body halves 22, therefore, function as massive heat sinks to insure maintenance of the desired above melt temperature for the pitch material passing under pressure to the extrusion holes 90 of the die tip.

As a further aspect of the present invention, the die body halves 22 carry a series of longitudinally spaced vertical cartridge heater insertion holes 38, FIGS. 2 and 4, which receive the cartridge heaters of rod form as at 132. The heaters are electrically energized from an electrical power source (not shown) via electrical leads 134, FIG. 2. The vertical insertion holes 38 which extend downwardly from the top or upper face 62 of the body halves 22, extend almost the full vertical distance through the body halves 22 to the L-shaped grooves 66, but terminate short of the groove bottom wall 68. The insertion holes 38, however, open to that groove bottom wall via smaller diameter holes 136 which are counterbored and tapped at 138. The tapped counterbore 138 in each instance receives a removable threaded plug 140. The plugs 140 at the bottom of the die body halves 22 facilitate the removal of any cartridge heaters 132 which may have swelled and become lodged as a result of use of the apparatus. Consequently, the machine tolerance of the insertion holes 38 is decreased allowing better contact and heat transfer between the cartridge heaters 132 and the die body 20. Under such conditions, by removal of the air deflector system bodies or blocks 54, 56, and the air plates 58, one or more plugs 140 may be removed, permitting insertion of a plunger or push rod (not shown) sized smaller than the diameter of the hole 136. This permits the end of the push rod to push on the bottom of the inserted cartridge heater 132 and force it axially upward and out of insertion hole 38.

A principal aspect of the present invention involves the careful control of the attenuating air streams for the extruded filaments as the molten pitch leaves the extrusion holes 90 and the prevention of adverse effects on the temperature control of that material as it passes under pressure from the inlet passage 42 through the coat hanger cavity 86 and through the die body extrusion holes 90. The supply of heated air is effected through the dual air chambers 24 mounted to respective sides of die body 20. Again, the air chambers 24 are formed of machined steel or other heat conductive metal components. The air chambers include upper and lower machined bodies as at 142 and 144, respectively, FIG. 2. The upper body 142 is of inverted U-shaped cross-section including a base or top wall 146 and inner and outer sidewalls 148 and 150, respectively. The open end of the u-shaped body 142 is closed off by the lower body 144 which is of modified rectangular block form. Body 144 includes an upper surface or face 152, a bottom face 154, and inner and outer faces 156 and 158, respectively. The upper face 152 carries recesses at its edges as at 160 and 162 which receive the outboard ends of the sidewalls 148, 150, respectively of the upper body 146.

The air chambers 24 are closed at its ends by end walls 164, and shown in FIG. 2, each end wall 164 has a circular hole or opening 166 which functions as an air inlet and is sealably connected to one end 26c of transfer tube 26 for feeding air under pressure from a respective air manifold 16. The upper and lower bodies 142 and 144 of air chamber 24 are screw mounted to the outside of the die body blocks or halves 22 by mounting screws 170 passing through holes 169, 171 respectively within bodies 142, 144 and have threaded ends received within tapped holes 168 of die body halves 22.

Important to the present invention and functioning to effectively thermally isolate the attenuating air from the die body 20, the sidewall 148 of each air chamber 24 is provided with a shallow groove or recess over nearly its full length, and mostly from top to bottom forming a dead air space between the air chamber 24 and die body 20. This space significantly inhibits heat loss from the die body 20 to the air chambers as result of the attenuating air flow from inert air sources 28.

Figure 5:
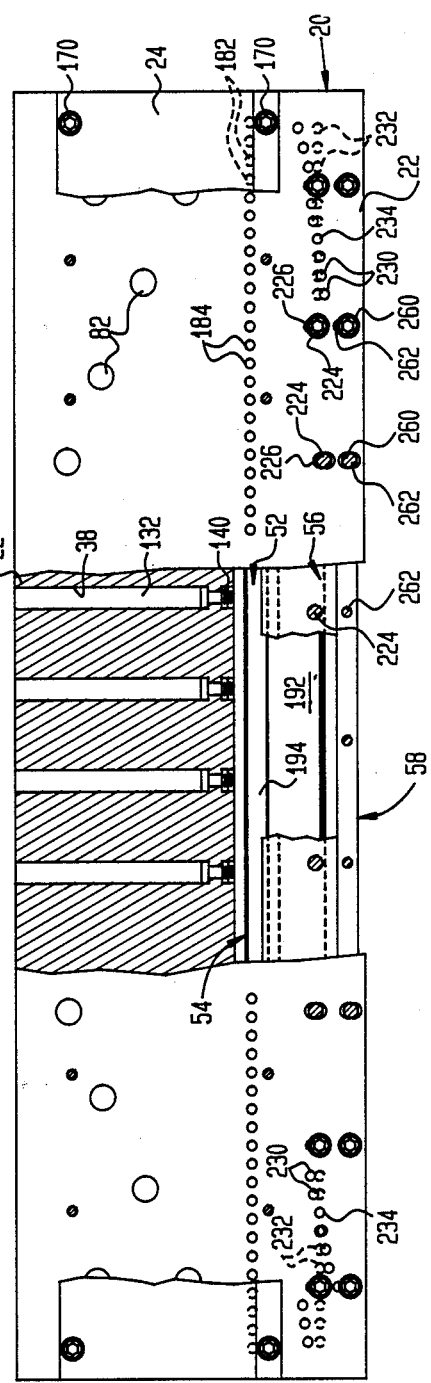
FIG. 5 is a side elevational view, partially broken away, of the melt blowing die showing the connections and adjustment between the die body halves and the components of the air deflector assembly and the air plates thereof.

The lower body 144 of the air chamber 24 has a relatively deep V-shaped groove 180 within upper face 152, at the center thereof, and a number of horizontally spaced air distribution holes 182 are drilled inwardly from the inner face 156 of body 144, which open to the V-groove 180. The large number of holes 182 may be seen in FIG. 5. Similar sized air distribution holes 184 of like number, are formed within the die body halves 22 from the side face 48 inwardly, being aligned with and opening to the L-shaped grooves 66 near the bottom of those grooves, FIG. 2. The air distribution holes 184 pass through the outer projection 76 of die body half 22.

The present invention involves the utilization of a novel air deflector assembly 54 defined by the male and female air deflector blocks or bodies 56, 54, respectively, fitted within the narrowed bottom portion of groove 66. The male air deflector block 54 is of inverted L-shape cross-section including a base portion 190 and a right angle leg portion 192. The base portion 190 has its width equal to the lateral width of the narrowed bottom portion of the L-shaped groove 66 and leg portion 192 is of a vertical height equal to the depth of the narrow portion of groove 66. The air deflector blocks are of elongated form running the full longitudinal length of the melt blowing die 20 and are of stainless steel or other metal. The male air deflector block 54 further includes a right angle strip projection or baffle 194 which extends from base portion 190 parallel to leg portion 192 and being laterally spaced therefrom. Projection 194 extends across and beyond the air distribution holes 184 within the die body half 22. Further, in the manner of the air chamber interior sidewall 148, the base portion 190 of the male air deflector block 54 includes, almost across the full width of the same, a shallow recess or groove 196 which forms a dead space 198 between it and the die body half 22 functioning to thermally isolate the base portion 190 of the male air deflector block 54 immediately facing the die body half 22 from die body 20. Leg 192 of male air deflector block 54 is provided with a shallow recess 202 defining with groove sidewall 72 and wide face 104 of die tip 50, a dead air space 204 for thermal isolation of block 54.

The female air deflector block 56 is of generally rectangular cross-sectional configuration and of a width less than the lateral width of the narrow portion of groove 66 bearing that member. Block 66 is comprised of a top face 206, a bottom face 208, an exterior side face 210 and an interior side face 212. The top face 206 is provided with a generally rectangular cross-sectional recess or groove 214 which extends the full length of body 56 and within which projects the end of strip projection 194. The groove 204 is considerably wider than the thickness of strip projection 192. The lateral width of the grooved 214, the depth of the same, the height of the strip projection 194, that is, its extent of its projection from base portion 190 of the male air deflector block 54 insures substantial spacing therebetween for the flow of the attenuating air stream through a U-shaped tortuous air passage, as seen by the arrows, FIG. 2, defined by the confronting surfaces of bocks 54, 56. Side 212 of block 56 is recessed over a major portion of its vertical height as at 212a immediately facing the leg portion 192 of the male air deflector block 54 to form a further downstream portion of the air passage for the air deflector assembly.

The corners or edges of the bodies or blocks 54, 56 along the air path defined by facing surfaces are rounded to smooth out the flow of air, although the purpose of configuring the facing surfaces of the spaced bodies or blocks 54, 56 is to effect a significant amount of turbulence of the air stream as it passes through the passage defined by the blocks to prevent stratification of the attenuating air stream and significant heat loss to the air stream from the die body 20 and deterioration of the filament forming process.

Figure 3:
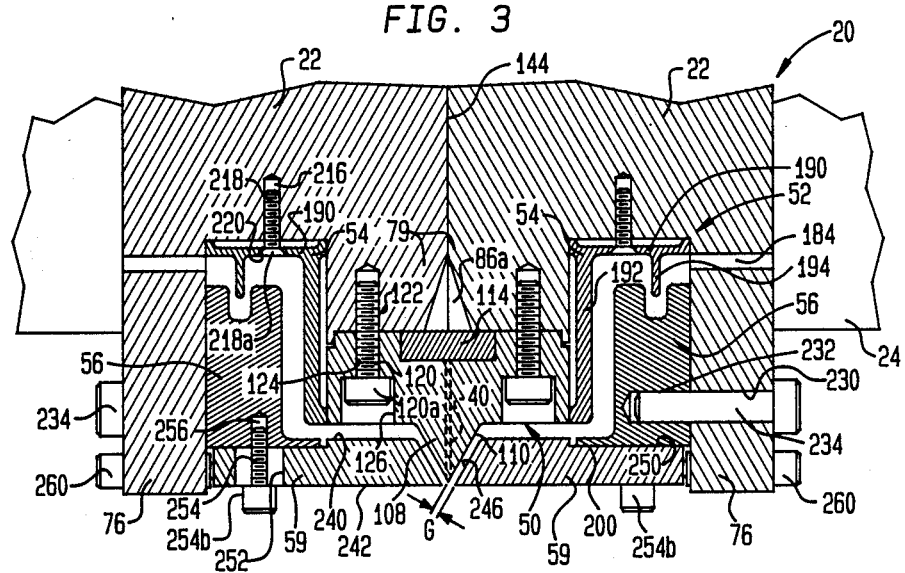
FIG. 3 is a transverse, vertical sectional view of the melt blowing die of FIG. 1 taken about line 3—3.

The male air deflector block 54 of each of the air deflector assemblies is fixedly mounted and immovable, while the same is not true for the female air deflector block 56 of each assembly 52. Referring to FIG. 3, tapped holes 216 within the die body halves 22 receive the threaded ends of mounting screws 218 whose heads 218a project within tapered holes 220 within the base portion 190 of the male air deflector block 54 at longitudinally spaced positions matching the longitudinally spaced tapped holes 216 for receiving the mounting screws 218.

Insofar as the female air deflector blocks 56 are concerned, these blocks are maintained in vertically adjusted but locked position within grooves 66 via a series of locking screws 224, FIG. 2, which project through oval vertically elongated holes or slots 226 within the exterior projection 76 at the bottom of each male die body half 22. Tapped holes 228 are formed within the female air deflector blocks 56 which receive the threaded ends of the locking screws 224.

The female air deflector blocks 56 are vertically raised and lowered in a stepped adjustment process which is effected through the utilization of at least two series of oblique spaced, smooth bore alignment holes 230 within the die body halves 22 and specifically horizontally drilled within the exterior projection 76 of die body 22. Further, each female air deflector block 56 includes at least two cooperating series of horizontally aligned and horizontally spaced alignment holes 232 sized identical to alignment holes 230 of the die body halves 22 and within which when given holes 230 and 232 are aligned, is projectable, a dowel pin 234, FIGS. 3 and 5, at such coincident hole location.

While the dowel pins 234 function to step raise or lower the female air deflector blocks 56, the purpose of such adjustment is not to modify the size of air passage defined by the male and female deflector blocks, but rather to control the amount of tip protrusion or recession of air plates 58, above or below the apex of nose 108 of the die tip 50. In that respect, the air plates 58 are mounted flush to the bottom face 208 of the female air deflector blocks 56 and are raised and lowered with blocks 56. Additionally, the air plates 58 are horizontally adjustably positioned relative to the die tip 50 so as to vary the air gaps G between the air plates and the die tip nose 108 adjacent the open end of the extrusion holes 90 within the die tip. The overall size of the air plates 58 are increased relative to the known prior art structures, both to accommodate the mass increase of the die body 20 and to prevent distortion of the air plates along their length at the high process temperatures (600°–650° F.) required in the extrusion of high softening temperature mesophase pitch. Each air plate 58 is of generally parallelepiped or rectangular block form having an upper or top face 240, a bottom face 242, an exterior side face 244 and an oblique interior side face 246. The oblique angle of the interior side face 246 matches the oblique angle of the side faces 110 of nose 108 of the die tip 50 and is complementary thereto. The vertical height of air plates 58 is somewhat smaller than the vertical height of the triangular cross-section nose 108 of die tip 50 to define part of the attenuating air passage by spacing top face 240 of the air plate from bottom face 106 of the die tip base 100, in each instance.

Further, the lateral width of the air plate 58 is less than the distance between the die body half projection 76 and the oblique sidewall 110 of the die tip nose 108. With reference to FIG. 2, lateral shifting of the air plates are permitted. That movement is guided by the presence of a recess 250 within the upper face 240 of each air deflector plate 58 with contact occurring between the lower or bottom face 208 of each female air deflector block 56 and the recess 250 of the corresponding male air deflector plate 58.

The physical mounting of the male air deflector plates 58 to the female air deflector blocks 56 is achieved in the manner seen in FIG. 3. Horizontally elongated oval slots or holes 252 are formed within the air plates 58, in an aligned row extending from one end of the air plate to the other, through which project the threaded ends of mounting screws 254. The threaded ends are received within tapped vertical holes 256 within male air deflector blocks 56 formed as a series in like number and aligned with the holes 252 within the air plates 58. The heads 254b of the locking screws 254 engage the bottom face 242 of the air plates to the side of the elongated holes or slots 252. The screws 254 permit, when backed off, sliding contact between the air plates and the female air deflector blocks 56 allowing a lateral shift in position of the air plates 58 on the female air deflector blocks 56. Screws 254 are then tightened down. Further, the air plates can be vertically raised and lowered to permit the air plates to project forwardly of or back of the nose 108 of die tip 50. Recession of the tips of air plates rearwardly of the plane of die nose 108 is technically termed "set back" of the air slot edge 245 where the oblique side face 246 of each air plate 58 meets the bottom face 242 of the same.

Further, the air gaps G exist between the oblique faces 110 of the die tip nose 108 and side faces 246 of the air plates 58 are readily adjustable by means of a plurality of jack screws 260. A series of jack screws 260 extend along the full length of the melt blowing die 14.

The jack screws 260 are mounted within vertically elongated oval holes or slots 262, FIG. 2, formed within the exterior projection 76 of each die body half 22. In the illustrated embodiment, the slots 262 are aligned with slots 226 receiving locking screws 224 for the female air deflectors blocks 56. The jack screws 260 have headed ends at 260a and threaded stems or ends 260b received within tapped holes 264 within the air plates 258 at longitudinally spaced positions corresponding to the slots 262 and screws 260 carried thereby. Further, a collar 266 is provided to each of the jack screws 260 such that the jack screws 260 are captured between collars 266 and heads 206a. Upon rotation of the jack screws 260, there is a lateral shifting of the air plates 58 towards and away from the triangular shaped nose 108 of the die tip 50 as shown by double headed arrow 261, FIG. 2, and thus effect a change in dimension of the air gap G formed therebetween to respective side of the extruded filamentary pitch material. The presence of the oval shaped slots 226 and 262 within the die body halves 22 permits vertical raising and lowering of the air plates 58 and thus change in set back of these air plates relative to the die nose 108 where the extrusion holes 90 open at the apex of the triangular cross-section nose 108 of the die.

It should be apparent from the above description that the melt blowing die and air manifold frame for supporting same is particularly useful in the melt blowing of high softening temperature mesophase pitch. In the past, using conventional melt blowing dies, the production was characterized by generally poor quality, shot-filled mats, and by short run times terminated by die plugging and excessive die pressures. Further, as the pitch softening pints increase beyond about 500° F., further complications arise from the increased tendency towards mesophase creation with the attendant undesirable effects on the stability of die operation and fiber in homogeneity and quality. When feedstocks containing high concentrations of mesophase are employed in melt blowing, the high viscosity and increased coking tendency of these feedstocks require a melt blowing die manufactured in accordance with the present invention. The melt blowing die of the present invention yields improved control and more uniform fiber diameters, permitting a significant increase in air flow rates as, for example, 80 SCFM versus 60 and air temperatures of 610° to 620° F., in order to maintain the same average diameter. In operation, the temperature at the extrusion die tip may range from 570° F. to 585° F. Improved operation has been achieved utilizing a die tip having twenty holes to the inch with the extrusion holes being of 0.012 inches diameter and with the die tip set forward by 0.011 inches relative to the air plates to each side thereof. The mounting frame facilitates the removal of the die as a unit and quick disconnection between the air chambers and the air manifolds feeding the same along respective sides of the elongated die. With the die body widened relative to conventional die bodies, the invention moves the cartridge heaters outwardly from the coat hanger slot or cavity and with the increased mass of metal for the die body halves, more effective and uniform heating of the extrusion liquid from inlet passage 42 through the coat hanger cavity and the extrusion orifices 90 is achieved. Further, this allows the cartridge heater bores 38 to be in line with the grooves 66 bearing air deflector assemblies 52. This permits bores to be drilled completely through the die body halves, permits the use of threaded plugs within counterbores on the lower surface of the die body halves at the grooves 66 to close off the bores by being threaded within the counterbores. Thus, if necessary, and upon removal solely of the air plates and male and female air deflector bodies, access may be had through the threaded plugs to the bores bearing the cartridge heaters for facilitating by rod insertion therein, forced removal of the cartridge heaters. As a result, the cartridge heater bores, in turn, can be sized very close to the diameter of the cartridge heater, irrespective of the fact that the cartridge heaters tend to swell in their middles. Thus, cartridge heaters, even if wedged due to expansion problems, can be driven out axially from one end or the other of the die body halves. The good surface contact between the cartridge heaters and the die halves at the bores renders heating of the coat hanger slot or cavity pitch liquid under conditions of high thermal efficiency, with close control of pitch melt temperature assured.

The present invention advantageously employs grooving of the sidewall of the air chambers in facing abutment with the exterior face of the die body halves with the shallow grooves functioning to create with the die body a dead air space for thermal isolation of the air chambers relative to the die body halves. Such shallow recesses and the dead air spaces defined thereby may be filled with suitable thermal insulation material to increase the thermal isolation between the die body and the air chamber. Such material may constitute a high temperature graphite composition. The same is true for the dead air spaces 198 and 204 defined by shallow recesses within the base 190 and leg 192 of the male air deflector block 54 facing respectively bottom face or wall 68 of slot 66 and sidewall 72 of that groove within the die body halves 22 receiving the same. These arrangements minimize heat loss from the die body halves to the attenuating air stream passing through the tortuous passage defined by the spaced, opposing male and female air deflection bodies or blocks 54, 56.

Advantageously, air plates 58 are shiftable transversely towards and away from the triangular cross-section shaped die tip nose 108 to vary the air gaps G to respective sides of the die tip nose where the extrusion holes 90 open to the attenuating air streams directed against the extruded material at the point of extrusion and from opposite sides thereof. Further, the air plates may be step adjusted rearwardly or forwardly of the die tip nose, being preferably positioned slightly rearwardly of the die tip nose to prevent interference to the air streams by buildup of the ejected liquid on the facing tips of the air plates. The mounting of the air plates to the female air deflector block permits lateral shifting of the air plates relative to the blocks supporting the same, while facilitating the step adjustment vertically of the air plates for set-back adjustment, all achieved in a simple but expeditious manner, utilizing appropriate locking screws, elongated slots and alignment pins selectively positioned commonly within smooth bore holes within the die body halves and the female air deflector block 56. The configurations provided to the confronting surfaces of the male and female air deflector blocks for the air deflector assembly provides tortuous paths for imparting turbulence to the attenuating air streams prior to discharge via dual gaps G against the extruded material where it leaves the extrusion holes 90 at the die tip nose 108. The turbulence set up during air movement from the air chambers through the attenuation discharge gaps G may be best seen by reference to FIG. 2 and the arrows showing that air flow.

While the invention has been particularly shown and described with reference to a preferred embodiment thereof, it will be understood by those skilled in the art that various changes in form and details may be made therein without departing from the spirit and scope of the invention.

What is claimed is:
1. A melt blowing die assembly comprising
  (a) a die body having (i) a triangular die tip having oblique side walls which intersect at an apex and a plurality of parallel orifices formed in the apex; (ii) flow passages for conducting melt material to the orifices; (iii) means defining first and second air passages for conducting air from the exterior of the die body to both sides of the die tip, each air passage including an elongate groove extending parallel to the apex of the die tip, a plurality of parallel flow distribution holes having inlets for receiving air into the die body and outlets discharging into the groove, and an elongate passage from the groove to the die tip for conducting a sheet of air to one side of the apex of the die tip; and (iv) an air deflector assembly mounted in each groove and having baffle means defining a tortuous passage for receiving air from the outlets of the die body air distribution holes to intermix air discharging therefrom, the air deflector assembly including an outer flock which in part defines the tortuous path, the block being secured to the die body by a first set of bolts and being adjustably movable in a direction parallel to the die tip orifices;
  (b) means defining first and second air chambers for conducting air to the first and second air passages, respectively, each air chamber having a plurality of parallel air flow distribution holes formed in a wall portion thereof, the flow distribution holes being aligned with the flow distribution holes of one of the air passages of the die body; and
  (c) a pair of coplanar air plates positioned on one side of the die body and extending outwardly on opposite sides of the die tip and defining therewith an outlet for the air passages on opposite sides of the die tip apex, each air plate being mounted on one of the outer blocks of the deflector assembly by a second set of bolts and being moveable with its block in a direction parallel to the die tip orifices, the air plates being adjustably movable in a direction perpendicular to the direction of the die tip orifices, whereby each air plate is adjustable in both parallel and perpendicular directions with respect to the die tip orifices by loosening the first and second set of bolts, locating each air plate in both the parallel and perpendicular positions and tightening the first and second set of bolts, the adjustment being made without disassemblage of the air plates from the body.
2. In a melt blowing die comprising:
  a metal die body, means defining a hollow cavity within said metal body for holding melt material; a melt inlet passage opening to said cavity for supplying melt material under pressure; said melt blowing die body including an elongate die tip nose in a triangular cross-section die tip nose terminating at an apex; a plurality of fine small diameter extrusion orifices within said die tip opening to the apex of said triangular cross-section die tip and communicating with said cavity; a pair of air plates mounted on said die body on opposite sides of said die tip and having oblique sides facing the triangular shaped die tip nose and therewith defining air passages which intersect each other at said die tip nose apex, and a pair of air passages formed in the die body for conducting air to each of the air passages defined by the nose piece and the air plates; means for delivering pressurized air streams to said air passages whereby air streams discharge from opposite sides of the orifice outlets and contact and attentuate the melt fibers discharging therefrom; the improvement wherein said metal die body includes (a) a pair of longitudinal grooves within the bottom of said die body, on opposite sides of said die tip, and extending parallel thereto, each groove forming a part of one of said air passages in the die body;

(b) an air deflector assembly mounted in each groove and comprising a pair of air deflector blocks, having facing surfaces defining air passage therebetween, said block facing surfaces are shaped to form a tortuous air passage therebetween to impart turbulence to air flowing therethrough;

(c) a plurality of vertical bores extending from a top surface of the die body to said grooves and opening thereto, said bores being counterbored at the bottom of said die tip grooves, a removable plug positioned within each of said counterbores for closing off said vertical bores, and removable cartridge heaters mounted in said vertical bores and axially inserted therein; said bore openings into said grooves permitting insertion of push rods with said plug, plates and blocks removed.

3. The die assembly as defined in claim 2, and further comprising air chambers mounted to respective sides of said metal die body for delivering air to said air passages, said air chambers being thermally insulated from the die body.

* * * * *